United States Patent [19] 4,001,788
Patterson et al. Jan. 4, 1977

[54] PATHFINDER MICROPROGRAM CONTROL SYSTEM

[75] Inventors: Garvin Wesley Patterson, Glendale; Marion G. Porter, Phoenix, both of Ariz.

[73] Assignee: Honeywell Information Systems Inc., Waltham, Mass.

[22] Filed: Mar. 26, 1975

[21] Appl. No.: 562,363

[52] U.S. Cl. .......................................... 340/172.5
[51] Int. Cl.² ........................ G06F 9/16; G06F 9/19
[58] Field of Search ............................ 340/172.5

[56] References Cited
UNITED STATES PATENTS

| | | | |
|---|---|---|---|
| 3,134,092 | 5/1964 | Newman et al. | 340/172.5 |
| 3,345,619 | 10/1967 | Anderson et al. | 340/172.5 |
| 3,363,234 | 1/1968 | Erickson et al. | 340/172.5 |
| 3,444,527 | 5/1969 | Hartley et al. | 340/172.5 |
| 3,560,933 | 2/1971 | Schwartz | 340/172.5 |
| 3,631,405 | 12/1971 | Hoff et al. | 340/172.5 |
| 3,689,895 | 9/1972 | Kitamura | 340/172.5 |
| 3,704,448 | 11/1972 | Osborne | 340/172.5 |
| 3,745,532 | 7/1973 | Erwin | 340/172.5 |
| 3,760,369 | 9/1973 | Kemp | 340/172.5 |
| 3,766,532 | 10/1973 | Liebel | 340/172.5 |
| 3,768,075 | 10/1973 | Reitsma et al. | 340/172.5 |
| 3,771,136 | 11/1973 | Heneghan et al. | 340/172.5 |
| 3,781,823 | 12/1973 | Senese | 340/172.5 |
| 3,859,636 | 1/1975 | Cook | 340/172.5 |
| 3,909,789 | 9/1975 | Holtey et al. | 340/172.5 |
| 3,943,494 | 3/1976 | Holmes et al. | 340/172.5 |
| 3,949,372 | 4/1976 | Brioschi | 340/172.5 |

Primary Examiner—Gareth D. Shaw
Assistant Examiner—Jan E. Rhoads
Attorney, Agent, or Firm—Faith F. Driscoll; Ronald T. Reiling

[57] ABSTRACT

A microprogram control system includes first and second control stores. The first is a pathfinder control store which is addressed initially by the operation code of a program instruction for read out of first and second addresses. The first address is used for accessing a standard microinstruction sequence during a first phase of operation. The second address is used for accessing an execution microinstruction sequence during a second phase of operation, both phases being required for executing the operation specified by the operation code of the program instruction. Means coupled to the second control store enable the control store to return to the standard microinstruction sequence following the completion of the second phase of operation when the instruction being executed requires the completion of additional operations before its execution can be terminated.

20 Claims, 7 Drawing Figures

PATHFINDER MICROPROGRAM CONTROL SYSTEM

RELATED APPLICATIONS

1. "Programmable Interface Apparatus and Method" invented by Garvin Wesley Patterson, William A. Shelly, Jaime Calle and Earnest M. Monahan, filed on even date herewith, Ser. No. 562,364 and assigned to same assignee named herein.

2. "Steering Code Generating Apparatus for Use in an Input/Output Processing System" invented by Garvin Wesley Patterson, William A. Shelly and Earnest M. Monahan, filed on even date herewith, Ser. No. 562,362.

3. "Priority Interrupt Mechanism" invented by Earnest M. Monahan, Garvin Wesley Patterson and Jaime Calle, filed on even date herewith, Ser. No. 562,315 and assigned to same assignee named herein.

4. "Dispatcher Mechanism" invented by Earnest M. Monahan and Garvin Wesley Patterson, filed on even date herewith, Ser. No. 562,314 and assigned to same assignee named herein.

5. "Fail Soft Memory" invented by Marion G. Porter, Jaime Calle, and Garvin Wesley Patterson, filed on even date herewith, Ser. No. 562,272 and assigned to same assignee as named herein.

6. "Instruction Look Ahead Having Prefetch Concurrency and Pipeline Features" invented by Marion G. Porter, filed on even date herewith, Ser. No. 562,272 and assigned to same assignee named herein.

7. "Data Alignment Circuit" invented by Darrell L. Fett, filed on even date herewith, Ser. No. 559,115, now U.S. Pat No. 3,967,101, and assigned to same assignee as named herein.

8. "Processor for Input-Output Processing System" invented by Marion G. Porter, Garvin Wesley Patterson, William A. Shelly and Nicholas S. Lemark, filed on even date herewith, Ser. No. 562,317 and assigned to same assignee as named herein.

9. "Method of Generating Addresses to a Paged Memory" invented by Garvin Wesley Patterson and Marion G. Porter, filed on even date herewith, Ser. No. 562,330.

10. "Memory Steering in a Data Processing System" invented by William A. Shelly, filed on even date herewith, Ser. No. 562,313.

BACKGROUND OF THE INVENTION

1. Field of Use

The present invention relates to control stores for controlling the sequence of elementary operations within a processing system and more particularly to a microprogrammed control store system which requires a small number of microinstructions and provides for increased processing efficiency.

2. Prior Art

In general, a substantial number of central processing units (CPU's), and input/output processing units (IOPS) employ microprogrammed control elements for executing program instructions. For the most part, the microprogrammed control elements include a single control store for storing microinstructions of a number of microinstruction routines, each utilized in executing an operation specified by the operation code (OP CODE) of the program instruction. In order to reduce the storage requirements of the control store, some systems have employed elaborate branching apparatus for sequencing to the different microinstruction routines in instances when it is possible to utilize the same routine for executing more than one type of instruction. To facilitate the sharing of routines, one system disclosed in U.S. Pat. No. 3,560,933 employs an adaptive encoding techinque which enables a given microinstruction sequence to be given varied interpretations. While this results in a reduction in the number of routines, the arrangement still requires elaborate branching apparatus.

In order to reduce the size of the control store, some systems have employed two control stores. In one system, one of the control stores utilizes a portion of the op code of a program instruction to access a microinstruction whose width is less than that of the microinstructions contained in the other control store. The accessed microinstruction provides an address for referencing the next and subsequent microinstructions from the second control store required for the instruction being executed.

In another system, one of the control stores is forced to access a common microinstruction sequence for fetching the next instruction to be executed. Thereafter, the op code of the instruction fetched is used to access a pair of words in the other control store, the second word of which is used to access a microinstruction sequence for executing the fetched instruction. For further information, reference may be made to the copending patent application titled "System for Extending the Interior Decor of a Microprogrammed Computer" invented by Antonio Brioschi bearing Ser. No. 511,135 filed Oct. 2, 1974 which is now U.S. Pat. No. 3,949,372, issued Apr. 6, 1976, and assigned to the assignee of the present invention. While the arrangement of the first system discussed above reduces the width of the control store, it does not provide for reducing microinstructions by maximizing the sharing of microinstruction sequences. Moreover, the arrangement requires apparatus for decoding the remaining bits of the op code during the execution of the instruction since only a portion of the op code was used to access the first microinstruction in the first control store.

In the arrangement of the second system discussed above, it has been found that since a single microinstruction routine is utilized for initial processing of all instructions, it limits the flexibility in terms of the types of instruction formats which can be processed. Further, in the arrangement, longer microinstruction sequences and additional cycles of operation are required for instruction execution. Accordingly, it is a primary object of the present invention to provide a microprogram control element which has reduced storage requirements.

It is a further object of the present invention to provide a microprogram control element which provides for increased processing efficiency.

SUMMARY OF THE INVENTION

The above objects are achieved in a preferred embodiment of the present invention by a microprogram control system which includes first and second addressable control stores. The first is a pathfinder control store which is accessed initially by the operation code of a program instruction to be executed for read out of a word containing at least first and second addresses. The first address and second addresses are applied in succession to address the second circuits of the control store during first and second phases of operation respectively.

The second control store is arranged to store a plurality of standard microinstruction sequences and execution microinstruction sequences. The first address is a standard sequence address which is used to access a particular one of the standard microinstruction sequences which is common to a group of program instructions. The standard microinstruction sequence is used for controlling such operations as address preparation, instruction counter updating, operand fetches and fetches of the next instruction. The second address is an execution address used for accessing one of the execution microinstruction sequences. The execution microinstruction sequence contains one or more microinstructions specific to the program instruction being processed.

Circuits coupled to the address circuits of the second control store enable the control store to return to the standard microinstruction sequence designated to perform any operations necessary for completing the processing of a current program instruction and beginning processing of the next program instruction.

The arrangment of the present invention enables these different program instructions which have identical control requirements during a portion of their processing to be assigned the same standard microinstruction sequence. Since such common microinstruction seqeunces appear only once in the second control store, this reduces the number of microinstructions which results in a substantial reduction in the control store requirements.

It will also be appreaciated that the standard microinstruction sequences are not restricted to a succession of microinstructions required to be processed in a strict sequence. That is, the standard sequence of microinstructions can be broken or interrupted for execution of one or more microinstructions of an execution microinstruction sequence which is specific to the program instruction being processed. This enables shorter microinstruction sequences to be used for program instruction execution which results in more efficient processing and increases in processor's speed. Since the appropriate standard and execution sequences of microinstructions required for processing a particular program instruction are designated by a pair of addresses contained in the pathfinder control store, the arrangement facilitates changes required for adding or deleting program instructions in addition to modifying the processing of instructions. In this case, the pathfinder control store would be writeable allowing for modification of the sequence addresses. However, once testing is complete, the pathfinder control store would be made read only.

It will be appreciated that the pathfinder control store can be made to include additional information useful in processing program instructions and for performing certain checking operations on the preferred embodiment of the present invention, each location of the pathfinder control store includes a privilege bit position and an address symbol bit position. The privilege bit position when set to a binary ONE causes the generation of a signal which tests whether the system is operating in a privileged or master mode. If the system is not operating in such a mode, an exception signal is generated indicating that the system is attempting an illegal operation. The address syllable bit position when set to a binary ONE causes the generation of a signal for determining whether a second level of indexing is to be performed by the standard sequence as a part of the address preparation operation. The signal tests a bit within the instruction being processed for ascertaining whether a second level of indexing is required. Those instructions which do not provide for a second level of indexing have their address syllable bits set to binary ZEROS. Thus, conditional indexing results in a reduction of the number of standard sequences of microinstructions.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
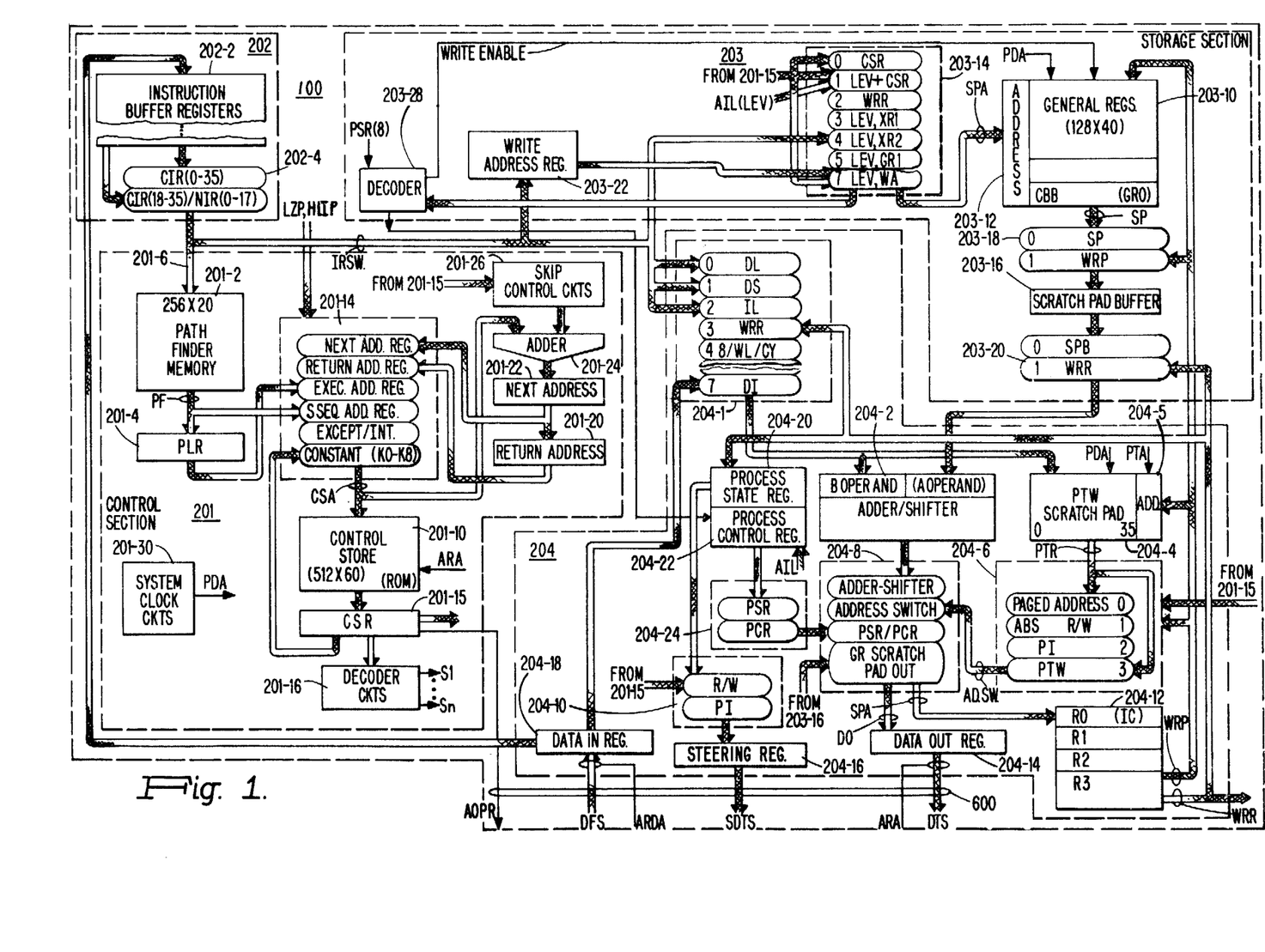
FIG. 1 is a block diagram of an input/output processing unit which incorporates the microprogrammed control element of the present invention.

Referring to FIG. 1, there is shown an input/output processor 100 incorporating the microprogrammed control system of the present invention. Referring to FIG. 1, it is seen that the processor 100 comprises a microprogrammed control section 201 of the present invention operative to generate control signals in response to sequences of microinstruction read out from a control store 201-10 for processing program instructions. As explained herein, the sequences are specified by contents of one of the locations of a pathfinder control store 201-2 accessed by the operation code of the program instruction to be processed. The processor 200 further includes an instruction buffer section 202 for storing instructions fetched from a memory, not shown, a storage section 203 and a processing section 204 for performing arithmetic and logic operations under the control of microinstructions read out from control store 201-10.

CONTROL STORE SECTION 201

Considering each section in greater detail, the pathfinder memory 201-2 can be constructed of alterable or fixed sections. For example, the memory 201-2 would be constructed to be writable in those instances where it is desirable to make modifications to the microinstruction sequences. Where no modifications are to be made, the pathfinder memory 201-2 is constructed of fixed sections which use for example, a read only memory (ROM) chips. The control store 201-10 is constructed of fixed sections which also use read only memory (ROM) chips. The store 201-10 is addressable via signals from any one of the eight address sources applied to a selector switch 201-14. The contents of the addressed locations are read out into an output register 201-15 and decoded as required by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 1, the six control store address sources include: interrupt/exception addresses derived from signals applied from external sources and circuits included within processor 100; a next address information position which receives next address information stored in a register 201-22 via an adder circuit 201-24; a return address register position which receives the return address contents of a return register 201-20; an execution address register position which receives an address from the pathfinder memory 201-2 via memory output register 210-4; a standard sequence address position which receives an address from pathfinder memory 201-2; and a constant position which receives a constant value from the output register 201-15.

The appropriate next address is generated by adder circuit 201-24 which receives as one operand input, address signals from one of the sources selected by switch 201-24 and as other operand input, signals from skip control circuits of a block 201-16. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by skip control 201-14 and constant signals provided by switch control circuits of block 201-26. Briefly, the different positions of switch 201-14 are selected in response to microinstructions read out from control store 201-10 to provide appropriate addresses for microinstruction sequences stored in control store 201-10 required for the execution of an operation specified by the op code of a program instruction. The instruction op code is applied to the pathfinder memory 201-2 via path 201-6 as shown. The return address register position of switch 201-14 is selected during sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 1 that a higher level Interrupt Present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher interrupt present signal is not inhibited or there is a signal applied to the LZP line, control signals from a microinstruction contained in register 201-15 define the time interval during which the switch 201014 selects the exception/interrupt position. The signal lines indicative of interrupt conditions are wired into different inputs of this position and define the address of the interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, over flow, etc.).

The timing signals required for establishing appropriate memory cycles of operation for section 201 as well as timing signals for operating other sections of processor 200 are provided by clock circuits included within a block 201-30. For the purpose of the present invention, the clock circuits as well as the other circuits of FIG. 1 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

INSTRUCTION BUFFER SECTION 202

This section includes a plurality of registers 202-2 for storing up to four words of instructions fetched from memory and applied via a data in register 204-10. The group of registers 202-2 is connected to a two position instruction register switch 202-4. The instruction register provides two outputs, a current instruction read output (CIR) and a next instruction read output (NIR). The selection of instruction words on a half or full word basis is made in accordance with the state of bit position 34 of the current instruction counter (IC) normaly stored in a first of the working registers of block 204-12. For the purpose of the present invention, the arrangement can be considered conventional in design.

STORAGE SECTION 203

Figure 2:
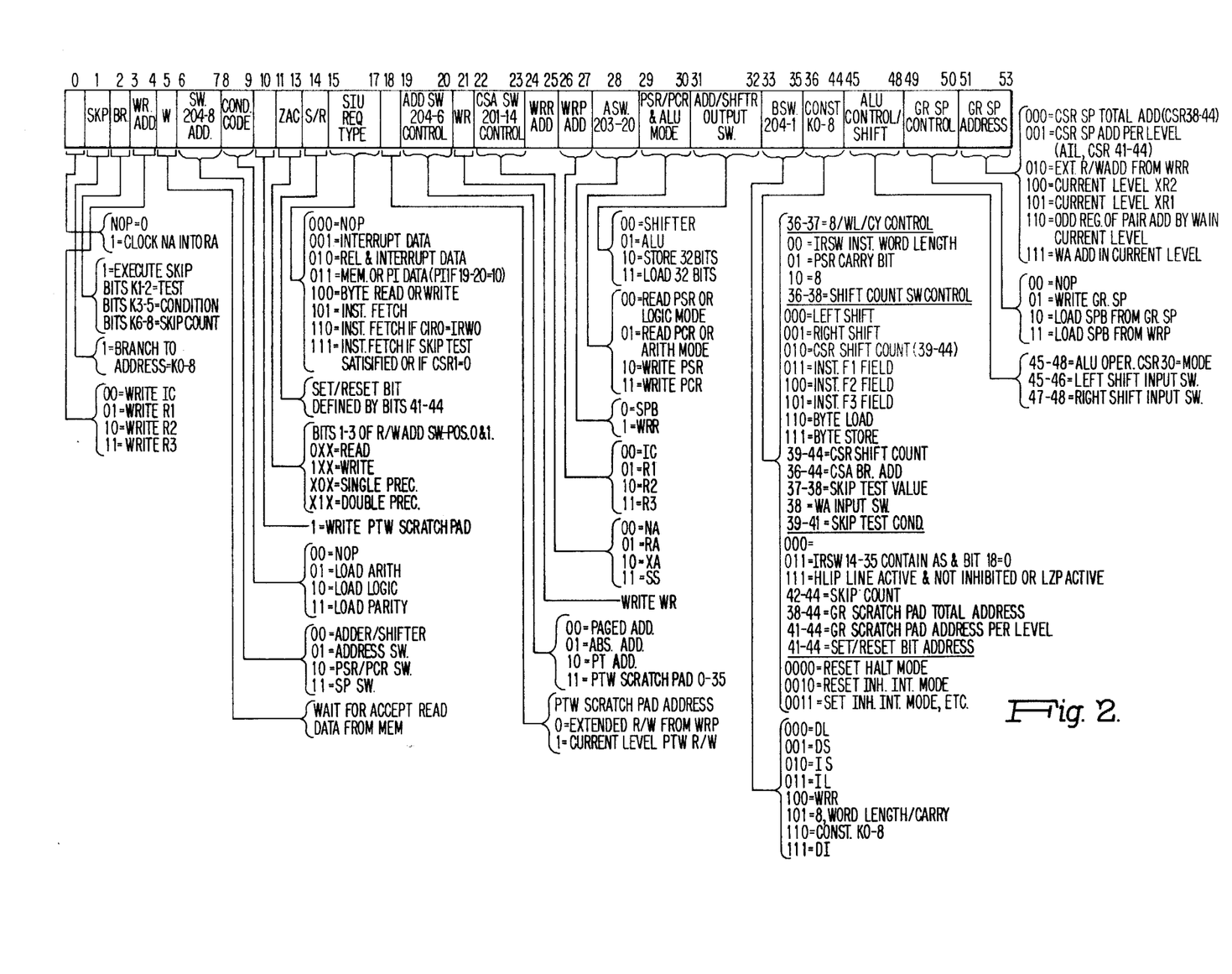
FIG. 2 illustrates the format of the words stored in one of the control stores of FIG. 1.

As seen from FIG. 2, this section comprises a scratch pad memory containing eight sets or groups of registers associated with eight different processes assigned a different one of eight different priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to an address input 203-12. The three most significant bit positions of address inputs 203-12 select one of the eight sets of registers (i.e. the level) while the remaining locations select one of the 16 registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, write address register provides address storage for loading or returning a result to one of the general registers of scratch pad memory 203-10. The write operation occurs upon the generation of a write clock signal which occurs either in response to switching to a binary ONE a clocked write flip-flop (not shown) or in response to a field of a microinstruction loaded into register 201-15. When generated by the write flip-flop, the write clock signal occurs when the flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 which is operative to generate a signal on a first output line each time register 203-22 stores an all zero address. This signal inhibits the generation of a write clock pulse by inhibiting a write enable signal applied to scratch pad memory 203-10. Additionally, the decoder network 203-28 receives a mode signal from the process state register 204-20. The state of the signal which indicates whether the processor 200 is in a master or slave mode of operation is "ANDED" with the output signal and is used to generate an exception signal on a second output line which is applied as an input to process control register 204-22 and to one input of the exception interrupt position of switch 201-14. As explained herein, this prevents alteration of the contents of the process state register location (GR0) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives for writing data signals applied from one of a pair of output buses selectively connected to any one of four working registers of block 204-12.

Each set of 16 registers include a process state register (PSR) location (general register 0) for storing information essential to controlling the current process. The first eight bit positions (0-7) of the register stores steering information coded to identify the interrupting module. The next position (i.e. 8) is a privilege bit position coded to identify the mode of operation (i.e. master or slave). The register includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 includes a control block base (CBB) register location which stores an absolute address pointing to the base of an exception control block and interrupt control block tables stored in memory. The first register GR0 of the highest priority set of registers (level 0) which is never altered, stores the control block base information. The interrupt control block (ICB) tables include 256 groups of storage locations which store information for processing the type of interrupt. The exception control block (ECB) tables 16 groups of storage locations which store information for processing the type of exception.

Exceptions are processore detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO.

PROCESSING SECTION 204

This section performs all of the arithmetic and logic operations required to process program instructions. The section 204 includes an adder/shifter unit 204-2 capable of performing arithmetic, shift and logic operations upon a pair of 36 bit operands. The results produced by either an adder portion or shifter portion of unit 204-2 are selected in response to microinstructions and thereafter selectively transferred via a four position "crossbar" switch 204-8 on a pair of output lines to any one of the working registers of block 204-12 and to a data output register 204-14. The data output register 204—connects to the lines of a data interface 600.

For the purposes of the present invention, the adder/shifter unit 204-2 can be considered conventional in design. Also, the unit 204-2 may include either circuits such as those disclosed in U.S. Pat. No. 3,811,039 to John P. Stafford or circuits disclosed in other documents referenced in the introductory portion of the present specification.

The block 204-12 includes a bank of four working registers R0 through R3 which provide as temporary storage for the instruction counter and for addresses and operands during instruction execution. The registers can be loaded from any one of the sources connected to switch 204-8 (i.e. adder/shifter 204-2, address switch 204-6, PSR/PCR switch 204-24 and scratch pad buffer input switch 203-18). The register to be loaded and write signal required for loading the register is established by fields included within the microinstruction read out to register 201-15.

As seen from FIG. 1, the registers are connected to a pair of output buses WRP and WRR. The WRP bus connects to the address inputs 204-5, to switch 203-18, to address switch 204-6 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 1, the processing section 204 includes process state register 204-20 and a process control register 204-22. The process state register 204-20 as mentioned is loaded from the working registers 203-12 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
|---|---|
| 0 | Operation not complete; no response on lines ARA or ARDA. |
| 1 | Page address bounds fault (key check). |
| 2 | Page access fault. |
| 3 | Page not resident in memory. |
| 4 | Illegal operation. |
| 5 | Process timer run out. |
| 6 | Overflow. |
| 7 | Lockup fault. |
| 8 | Address misalignment. |

The term "fault" does not necessarily mean the occurrence of a hardware failure but includes error conditions etc.

Bit positions 9-15 identify processor detected parity errors and bit positions 23-26 which identify the processor number and level received from the PNID and AIL lines. Bit position 27 is an interrupt inhibit bit position while bit positions 28-35 store interrupt request bits which when set to a binary ONE indicate an interrupt at a level corresponding to the bit positon (e.g. bit 28=0) plus 8. The bit positions 27-35 are loadable by program instruction from the bank of registers of block 204-12 via output bus WRR.

The contents of each of the registers 204-20 and 204-22 are selectively applied as an input to another one of the positions of the cross bar switch 204-8 via a two position data selector switch 204-24. The register 204-20 also connects to the PI positions of a two position steering selector switch 204-10 and a four position address selector switch 204-6.

The steering switch 204-10 provides steering information which is used to transfer the command to the correct receiving unit. One of the fields contained in the microinstructions read out to register 201-15 selects the appropriate position for either a memory command or a PI command for reading or writing a register located external to processor 200. The steering information for a memory command is generated from fields included within the microinstruction and with paging address information from scratch pad memory 204-4 or absolute address information from bus WRP.

In the case of an external register (PI) command, the steering information is generated as follows: bit 0 if forced to a binary ONE for a PI command; bits 1-4 correspond to bits 0-3 of register 204-20; and bits 5-6 correspond to bits of one of the fields of the microinstruction which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. In the case of a PI command, the command including additional steering information is provided by position 2 of address switch 204-6. For further information regarding external register commands reference may be made to the related patent applications referenced at the beginning of the specification.

As also seen from FIG. 1, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for referencing memory.

CONTROL STORE WORD FORMATS

As in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 1 for addressing of the different scratch pad memories and selection of operands, signals for specifying various test conditions for branching, signals for controlling the operation of an adder/shifter unit of section 204 and signals for providing control information necessary for generating memory and PI commands.

In greater detail, FIG. 2 illustrates the format of the microinstruction words stored in control store 201-10. Referring to that FIGURE, it is seen that bits 0-2 are coded to define a NOP, return, branch or skip operation. Bits 3-4 are used to define the selection of the working register to be written, while bit positions 6-7 are used to define selection of output sources applied as inputs to the working registers. Also, bit 30 defines whether adder/shifter 204-2 is to perform an arithmetic or logic operation, bits 45-48 define the function to be performed by the ALU or the operands to be shifted. While bits 36-44 define the number of bit positions to be shifted and the direction. Also, bits 31-32 are coded to define which output from adder/shifter 204-2 is to be applied to the adder/shifter position of switch 204-8. As concerns the selection of operands, it is seen that bits 33-35 define the B operand source selected by B switch 204-1 while bit 28 defines the A operand source selected by A switch 203-20. Bits 11-13 are coded to define the type of memory operation during the generation of memory commands while bits 15-17 are coded to define different types of requests made by processor 200 in connection with generating commands.

As concerns the different selector switches of FIG. 1, it is seen that bit 18 is coded to define the address source for address lines 204-5, bits 19-20 are coded to define the output source selected by address switch 204-6, bits 24-25 are coded to define the contents of the register of bank 204-12 selected to be applied to the WRR bus (i.e. read address for WRR) while bits 26–27 are coded to define the contents of the register of bank 204-12 to be applied to the WRP bus (i.e. read address for WRP). Bit 30 defines the source for switch 204-24, bit 50 selects the source for switches 203–18 while bits 51–53 are coded to define the address source for address inputs 203-12 (i.e. defines function SPA). Also, bits 41–44 and bits 38–44 define address values for address inputs 203–12.

It will also be noted that a number of the bits of a microinstruction are used to control the operations of control section 201. For example, bits 22–23 are coded to define the address source for control address switch 201-14 (i.e. defines function CSA). For a microinstruction specifying a branch operation, bits 36–44 define a constant to be applied to constant position of switch 201-14. For a microinstruction specifying a skip operation, the same bits are used to define values used in conditioning the circuits 201-16 for performing skip operations. Bits 10, 21, 29, 49 and 50 are coded to define the transfer operations indicated in FIG. 2.

Figure 3:
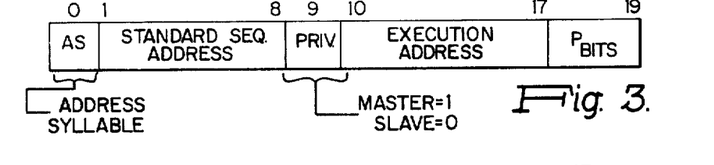
FIG. 3 illustrates the format of the microinstructions stored in another one of the control stores of FIG. 1.

FIG. 3 illustrates the format for the word contents of pathfinder control store 201-2. Bit 0 when set to a binary ONE defines that the instruction being processed contains an address syllable used for a second level of indexing during address preparation. Bits 1–8 define a standard sequence address which points to the first microinstruction of the standard sequence of microinstructions required for processing the program instruction. These microinstructions are contained within the lower half of control store 201-10 (i.e. locations 0–255). Bit 9 is a privilege bit which when set indicates that the processor 200 must be in a privilege mode (i.e. PSR bit 8 must equal a binary ONE).

Bits 10–17 define an execution address which points to the first microinstruction of the execution sequence of microinstructions required for completing processing the program instruction. These microinstructions are contained within the upper half of control store 201-10. (i.e. locations 256–511). The high order bit of the execution address (bit 0) is not contained in pathfinder memory 201-2 but is set to a binary ONE to address the upper portion of control store 201-10. Similarly, the high order bit of the standard sequence address (i.e. bit 0) is also not contained in pathfinder memory 201-2 but is set to a binary ZERO to address the lower portions of control store 201-10. This is accomplished by wiring the bit zero positions of the execution address and standard sequence address positions of switch 201-14 to a binary ONE and a binary ZERO respectively.

DETAILED DESCRIPTION OF OPERATION

Figure 4A:
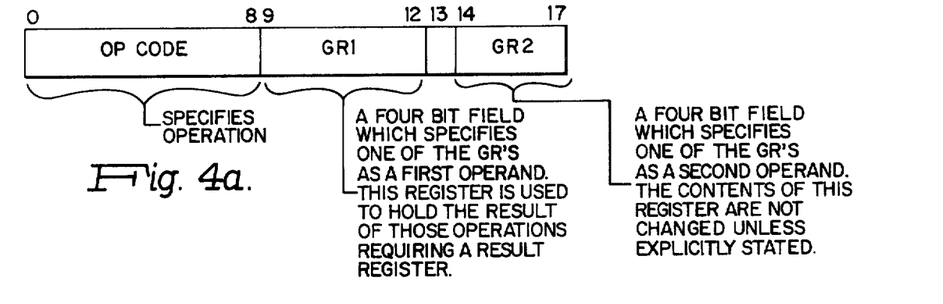
FIGS. 4a and 4b illustrate the formats of ADD and STORE program instructions.
Figure 4B:
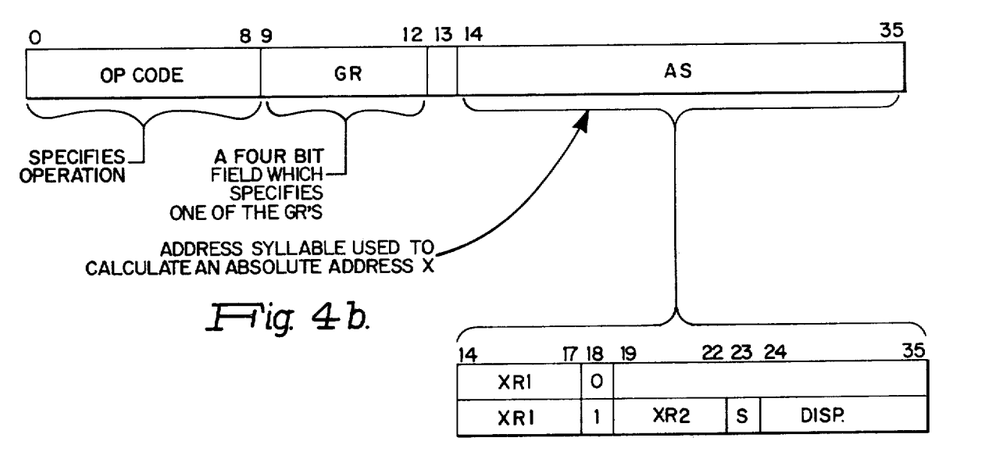
Figure 5A:
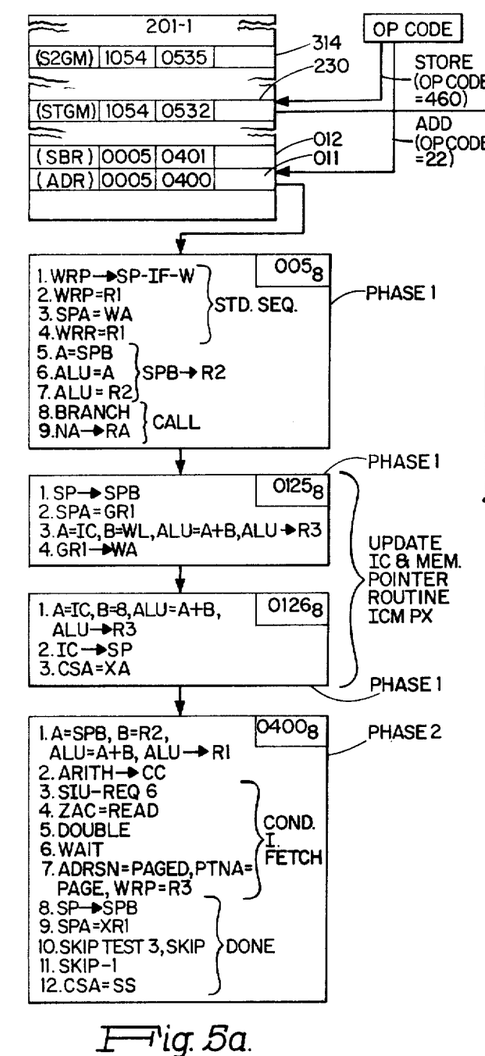
FIGS. 5a and 5b are flow charts illustrating the operations performed during the processing of program instructions in accordance with the present invention.
Figure 5B:
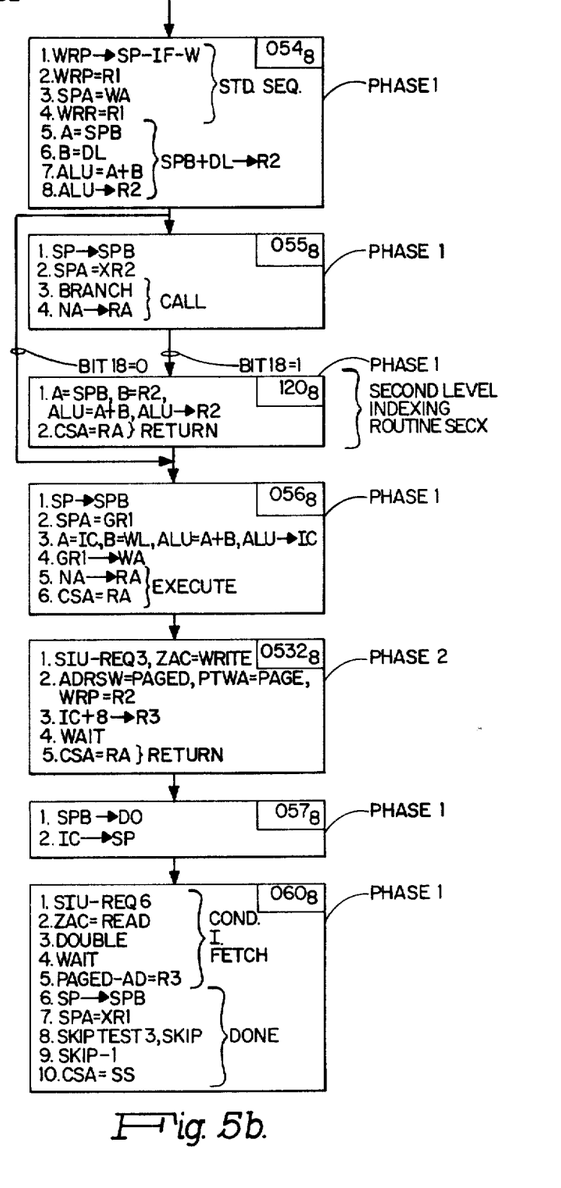

With reference to FIGS. 1 through 4 and the flow charts of FIGS. 5a and 5 b, the operation of the apparatus of the present invention included in the processor 200 of FIG. 1 will not be described. First, the operation will be described with respect to the processing of an ADD instruction of FIG. 4a and then with respect to the processing of a store instruction of FIG. 4b.

Before describing the above operations, it should be noted that the processing of a program instruction includes the following operations. First, the instruction op code is used to access a location within pathfinder memory 201-2 during a first cycle of operation. Next, one or more cycles are performed by the processor 200 under the control of microinstructions from the standard sequence of microinstructions designated by the standard sequence address contained in the pathfinder location. Following that, processor 200 performs one or more cycles of operation under control of microinstructions from the execution sequence of microinstructions designated by the execution address contained in the pathfinder location. Depending upon the type of program instruction being processed, the processor 200 returns to the standard sequence and performs additional cycles under the control of microinstructions contained in that sequence.

First referring to FIG. 4a, it is seen that an ADD instruction has the format containing two 4 bit fields specifying the contents of a pair of scratch pad general register locations. The first phase of the ADD operation involves preparation of the operand addresses, fetching the operand, updating the instruction counter and instruction memory pointer. These operations are performed by the standard sequence of microinstructions. The second or execution phase of the ADD operation involves adding the two operands with the sum being returned to GR1 and begin processing of the next instruction. The operations are performed by the execution sequence of microinstructions.

FIG. 5a shows in greater detail, the operation performed by processor 200 in processing the ADD instruction.

It should be appreciated that prior to the execution of a current program instruction, a certain amount of processing of that instruction occurs during the processing of the previous instruction. For further information, reference should be made to the copending patent application of Marion G. Porter titled "Instruction Look Aheading Having Prefetch, Concurrency and Pipeline Features" referenced under the related application section of the subject specification.

Briefly during the previous cycle of operation described later herein, the contents of the general register location specified by bits 14–17 of the next instruction are read out from scratch pad memory 203-16. From FIGS. 4a and 4b, it is seen that the contents correspond to the general register location in the case of an instruction formatted as shown in FIG. 4a specified by GR2 or an index register location specified by XR1 in the case of an instruction formatted as shown in FIG. 4b.

Referring to FIG. 5a, it is seen that when the ADD op code from switch 202-4 is applied to pathfinder control store 201-2, the contents of pathfinder location 011 are accessed and bits 10–17 are read out to register 201-4. It is seen that the standard sequence address specifies octal location 005 in control store 201-10 while the execution address specifies octal location 0400.

As seen from FIG. 1, both addresses are applied to switch 201-14. During the last cycle of operation of the previous program instruction, the microinstruction contents of location 005 are addressed and read out to register 201-15 for decoding by circuits 201-16. The standard sequence address position of switch 201-14 is selected during the execution of the last microinstruction read out to register 201-15.

As a first step of the first cycle, the processor 200 writes the results of the instruction just processed into the location of scratch pad memory 203-10 specified by the contents of write address register 203-22. Also, during the same cycle of operation, the contents of general register location GR2 stored in buffer 203-16 are applied to the A operand input transferred by adder/shifter 204-2 into working register R2 of bank 204-12. During the same cycle, a call operation is performed in which a branch address from register 201-15 is applied via the constant position of switch 201-14 to control store 201-10 and the contents of the next address register 201-24 are loaded into the return address register 201-20. The branch address when applied to control store 201-10 is incremented by one and loaded into next address register 201-24 via adder 201-22.

The above causes control store 201-10 to branch to location 0125 to access a first microinstruction of an update IC and memory pointer routine (ICMPX). It is seen that during this cycle of operation, the contents of the general register location specified by bits 9–12 of the instruction are read out into buffer 203-16. Also, the IC register contents applied via switch 203-20 are added to the value applied to the position 8/WL/CY position of switch 204-1 and the sum is stored in working register RO.

The branch address is incremented by one by adder 201-22, stored in register 201-24, and is also applied to control store 201-10 via the next address register position of switch 201-14 fore read out of the microinstruction word stored in location 0126. During this cycle, the contents of the IC register of bank 204-12 are incremented by 8 and the result is loaded into working register R3. Also, the IC result is written via the WRP bus into location GR1 of scratch pad memory 203-10.

It is also seen from FIG. 5a that during this cycle, switch 201-14 is conditioned to select the execution address register position to begin the second phase of instruction processing. Accordingly during this cycle of operation, the microinstruction word specific to the ADD instruction is read out from location 0400. The processor 200 under the control of this microinstruction performs the addition of the operands R1 and R2 and stores the result.

In greater detail, the R1 operand stored in buffer 203-16 is applied to the A operand inputs of adder/shifter 204-2 while the R2 operand stored in working register R2 is applied via the WRR bus and WRR position of switch 204-1 to the B operand inputs of adder/shifter 204-2. The adder/shifter 204-2 is conditioned to sum both operands and load the result into working register R1. Based upon the results of the operation the appropriate condition code is loaded into PSR register 204-20. Also, during this cycle, a check is made by circuits not shown, to determine whether another instruction can be fetched from memory and loaded into the instruction buffer 202-2. If there is space available in the buffer, the operations 3–7 take place which cause a double word of information to be fetched from memory. For ease of explanation, it will be assumed that the buffer 202-2 is full and that these operations are not performed.

It will be noted that the last group of operations performed during this cycle are those operations which are discussed in connection with the previous processed instruction. More specifically, the register location specified by bits 14–17 of the next instruction to be processed are read out to buffer 203-16. Also, during the cycle, bit 18 of the instruction is tested in order to determine whether a second level of indexing is required. If it is not required, the skip count addition is omitted by the circuits 201-26. Additionally, the switch 201-14 is conditioned to select the standard sequence address position.

From the above, it is seen that the arrangement of the present invention requires that a limited number of microinstructions be included in both the standard and execution sequences. In fact, it is seen that the ADD instruction requires only one microinstruction. Because of shorter sequences, processor 200 is able to process instructions most expeditiously.

It is also seen from FIG. 5a that the op code of an instruction specifying a subtract operation selects the contents of pathfinder location 012. It is seen that the location 012 specifies the same standard sequence and an execution sequence for performing a subtaction operation. In a similar fashion, other groups of program instructions will also utilize common standard sequences. One such group includes store instructions having the formats of FIG. 4b.

Referring to FIG. 4b, it is seen that the store instruction has an eight bit op code for specifying the operation to be performed (i.e. code = 460 octal). Bits 9–12 specify one of the general registers and bits 14–35 are an address syllable used to calculate a memory absolute address. The address syllable portion can be formatted to specify a single level of indexing (e.g. XR1) or two levels of indexing (e.g. XR1 and XR2). As seen from FIG. 4b, the type of indexing is specified by the state of bit 18. In the latter instance, bit 23 is a sign bit and bits 24–35 correspond to a displacement value.

In this example for ease of explanation, it is assumed that bit 18 of the store instruction is a binary ZERO. In general, the processor 200 during the processing of the store instruction is operative under control of the standard sequence microinstructions to perform required address preparation and update the contents of the instruction counter. Under the control of the execution sequence microinstruction, processor 200 issues a store command to memory and returns to the standard sequence for transferring the contents of the register to be stored in memory to the data out register 204-14 and begin processing of the next program instruction.

In greater detail, it is seen from FIG. 5b that the op code of the store instruction causes the contents of octal location 230 of pathfinder control store 201-2 to be read out and bits 10–17 are loaded into register 201-4. The standard sequence address 054 is applied via the standard sequence position of switch 201-14 which causes control store 201-10 to read out the contents of location 054. Also during the cycle, the adder 201-22 increments by two the standard sequence address which is loaded into next address register 201-24.

Operations similar to those described above in connection with the ADD instruction are performed by processor 200 under control of the microinstruction read out from location 054. This results in the contents of the index register specified by bits 14–17 of the instruction read out during the processing of the previous instruction being added to the displacement field of the instruction and the results are transferred to working register R2.

During the next cycle of operation, the contents of the register location specified by bits 9–12 are read out into buffer 203-16. The value WL applied via B switch 204-1 is added to the IC contents applied via A switch 203-20 and the result is transferred to the IC working register of bank 204-12. The contents are also written into location GR1 of scratch pad memory 203-10. Also, the incremented contents of next address register 201-24 are loaded into return register 201-20 and the switch 201-14 is conditioned to apply the execution address contained in register 201-4 to control store 201-10.

As seen from FIG. 5b, the control store 201-10 branches to octal location 0532 for read out of a microinstruction word of the execution sequence. Under control of this microinstruction, processor 200 operates to generate a memory request specifying a write operation and apply the appropriate memory address obtained from memory 204-4 and working register R2 via address switch 204-6 and "cross bar" switch 204-8 to data out register 204-14. The adder/shifter 204-2 increments by 8 the contents of the IC working register and stores the result in working register R3. The processor 200 delays the execution of a next microinstruction until it receives a signal from memory acknowledging acceptance of the request. Also, switch 201-14 is conditioned to apply the address contents of return register 201-20 as a next address to control store 201-10.

Upon receipt of a signal from memory (i.e. line ARA is forced to a binary ONE), the control store 201-10 is caused to return to the standard sequence and read out the contents of octal location 057. During this cycle of operation, the processor 200 transfers the data contents of general register GR1 to be written in memory, read out by the microinstuction stored in location 056 via the A switch 203-20 through adder/shifter 204-2 and cross bar 204-8 into the data out register 204-14. Also, the updated contents of the IC working register are stored in scratch pad memory 203-10.

In the manner described above, the return address applied to control store 201-10 is also incremented by adder 201-22 and stored in next address register 201-24. Accordingly, absent any signals from register 201-15, the incremented contents of register 201-24 are applied via next address register position of switch 201-14 to control store 201-10. This conditions the control store 201-10 to read out the microinstruction stored in the next successive location which corresponds to octal 060.

During the next cycle, the processor 200 performs the operations indicated under control of the microinstruction read out from location 060. As mentioned, these operations involve the fetching of another instruction and the advance processing of the next instruction.

From the above, it is seen that the arrangement of the present invention provides for interruption of a standard sequence of microinstructions where convenient to enable execution of those microinstructions comprising the execution sequence which are specific to the program instruction being processed. The control store is then able to return to complete execution of the standard sequence for completion of instruction processing.

It will be noted from FIG. 5a that a program instruction specifying a store double operation also employs the same standard sequence and another execution sequence for conditioning processor 200 to perform operations for issuing the memory command and for transferring a first data word to data out register 204-14.

It will be appreciated that each of the instructions mentioned do not specify privileged operations and therefore, bit 9 of each of the locations 011, 012, 230 and 314 is a binary ZERO. In the case where an instruction specified a privileged operation, the execution address such as 0400 or 0532 would appear as 1400 or 1532. When read out, the binary ONE produces a signal which tests the state of privilege bit position 8 of PSR register 204-20. In the case of a comparison (i.e. both not ONES) bit position 4 of PCR register 204-22 is switched to a binary one signaling the violation. At the same time, the switch 201-14 is conditioned to select the exception/interrupt position rather than the sequence address register position. Thus, the processor 200 automatically enters an exception routine for ascertaining the nature of the illegal operation. In this manner, the apparatus of the present invention can also be used to ensure system protection by providing for detection of illegal operations with the introduction of a minimum amount of additional apparatus.

From the foregoing, it is seen that the pathfinder microprogrammed control apparatus of the present invention provides for very efficient instruction processing while also reducing significantly the storage requirements of such apparatus.

It will be appreciated that many modifications may be made to the apparatus of the present invention such as changes in the formats and codes of the words stored in pathfinder memory 201-2 and in control store 201-10. It should also be noted that while the different operations shown in the different blocks of FIGS. 5a and 5b appear in sequence that these operations are performed in parallel.

While it will be appreciated that the apparatus of the present invention is not limited to any particular type of coding, a listing of the type of microinstruction coding is included as part of an appendix. For further information regarding formats and coding, reference may be made to the test titled "Microprogramming: Principles and Practices" by Samir S. Husson published by Prentice-Hall, Inc., Copyright 1970 and to the referenced applications.

While in accordance with the provisions and statutes, there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. A cyclically operable microprogram control system for use in an information handling system for generating subcommand signals for controlling systems operations required for processing program instructions, each program instruction including an operation code, said microprogram control system comprising:
    a first store for storing address words, each including a plurality of addresses;
    a second store for storing standard sequences of microinstruction words and execution sequences of microinstruction words;
    each of said first and second stores including addressing means and output register means for providing access to said store contents and storage for said address and microinstruction words read from said first and second stores respectively; and,
    selection means coupled to said output register means of said first and said addressing means of said second stores, said selection means receiving said plurality addresses of an address word read out from said first store in response to said operation code during the processing of said program instruction, said selection means applying selectively each of said plurality of addresses to said addressing means of said second control store for accessing microinstructions of said standard and execution sequences respectively for generating said signals during first and second phases of operation required for processing said program instruction.

2. The microprogram control system of claim 1 wherein said system further includes:
   register means for storing a multibit operation code of a program instruction; and
   means coupled to said register and to said addressing means of said first store for applying bits of said op code for selecting an address word in said first store specifying the locations of first microinstructions within said standard and execution microinstruction sequences.

3. The microprogram control system of claim 2 wherein said system further includes:
   a first address register connected to said selection means for storing the address of a next microinstruction to be accessed from said second store; and,
   incrementing means coupled to said selection means for receiving signals representative of said addresses applied to said second store, said incrementing means being coupled to said address register and operative to increment said addresses stored in said address register during said first and second phases for sequencing through the microinstructions of said standard and execution sequences during successive cycles of operation.

4. The microprogram control system of claim 3 wherein said system further includes:
   a second address register for storing a return address, said second address register being coupled to said switching selection means and to said first address register for receiving an address specifying a microinstruction within said standard sequence; and,
   said switching selection means being operative in response to signals from a microinstruction of said execution sequence read from said second store to apply said next address from said second register to said second store addressing means for causing said second store to return to said standard sequence.

5. The system of claim 4 wherein said first store is a writable store enabling changes to be made to said address words for altering processing of said program instructions.

6. The system of claim 4 wherein said first and second stores are read only memories.

7. The system of claim 4 wherein each of said address words include a standard sequence address field and an execution sequence address field for accessing a first microinstruction word in a standard sequence and an execution sequence specified by said operation code of said program instruction for the processing thereof.

8. The system of claim 7 wherein each address word of said first store includes an address syllable bit coded to specify when additional microinstructions of a standard sequence are required for processing said program instruction, said selection means including means conditioned by said address syllable bit when in a first state to generate an output signal for testing whether said program instruction requires execution of said additional microinstructions.

9. The system of claim 7 wherein each address word of said first store includes a privilege bit coded to specify when said program instruction is privileged, said selection means including means conditioned by said privilege bit when in a first state to generate an output signal for testing whether said information handling system is in a privilege mode of operation for permitting execution of said program instruction.

10. A microprogrammed control system for use in a processing system for controlling operations in response to program instructions, each program instruction including an operation code, said system comprising:
   an addressable control store including a plurality of locations for storing address words including at least first and second addresses, means coupled to said store for applying said operation code of said each instruction to said control store for accessing one of said locations;
   an output register coupled to said control store for storing the address contents of an accessed location specified by said operation code during first and second phases of operation required for performing the operations specified by said each program instruction;
   a cycled addressable microinstruction control store including a plurality of storage locations for storing microinstructions of a plurality of standard sequences and execution sequences;
   an output register coupled to said microprogrammed control store for temporarily storing the microinstruction contents of any accessed location during each cycle of operation of said microprogrammed control store; and,
   address input means coupled to said microprogrammed control store and operatively coupled to said control store and to said output register for receiving said first and second addresses respectively, said address input means selectively applying said first and second addresses to said microprogrammed control store for read out of said microinstructions of said standard sequence and said execution sequences respectively to said output register.

11. The microprogram control system of claim 10 wherein said system further includes:
   a first address register connected to said address input means for storing the address of a next microinstruction to be accessed from said microinstruction control store; and,
   incrementing means coupled to said address input means for receiving signals representative of said addresses applied to said microinstruction control store, said incrementing means being coupled to said address register and operative to increment said addresses stored in said address register during said first and second phases for sequencing through the microinstructions of said standard and execution sequences during successive cycles of operation.

12. The system of claim 11 wherein said system further includes:
   a second address register for storing a return address, said second address register being coupled to said input address means and to said first address register for receiving an address specifying a microinstruction within said standard sequence; and,
   said input address means being operative in response to signals from a microinstruction of said execution sequence read from said microinstruction control store to apply said next address from said second register to said second store addressing means for causing said microinstruction control store to return to said standard sequence.

13. The system of claim 12 wherein said control store is a writable store enabling changes to be made to said address words for altering processing of said program instructions.

14. The system of claim 12 wherein said control store and said microinstruction control store are read only memories.

15. A microprogram control system for use in an input/output processing system, said microprogram control system comprising:
   an instruction register for storing at least one program instruction, said instruction including an operation code;
   an addressable pathfinder store coupled to receive said operation code, said store including a plurality of locations, each for storing a word including at least first and second addresses identifying a first microinstruction of one of a plurality of standard sequences and a different one of a plurality of execution sequences respectively and an output register connected to said store for storing the word contents of a location specified by said op code;
   a cycled addressable control store including a plurality of locations, a first group of locations storing microinstructions of a number of standard sequences and a second group of locations storing at least one microinstruction of a different one of a plurality of execution sequences required for processing different types of program instructions and an output register connected to said control store for temporarily storing the microinstruction contents of an accessed location during a cycle of operation of said control store; and,
   address switch means having at least first and second inputs and at least one output, said first and second inputs being connected to said pathfinder store and to said pathfinder output register respectively for receiving signals corresponding to said first and second addresses and said one output being connected to apply selectively said first and second addresses to said control store for accessing successively microinstructions of one of said number of standard sequences and a predetermined one of said execution sequences respectively defined in accordance with said operation code.

16. The microprogram control system of claim 15 wherein said system further includes:
   adder means coupled to said address switch output for receiving addresses applied to said control store;
   a first address register connected to said adder means for storing the address of a next microinstruction to be accessed from said control store received from said adder; and,
   said address switch means further including a third input connected to said first address register for applying a next address to said control store.

17. The microprogram control system of claim 16 wherein said system furter includes:
   a second address register for storing a return address, said second address register being coupled to said first address register for receiving an address specifying a microinstruction within said standard sequence; and,
   said address switch means including a fourth input connected to receive said return address said address switch means being operative in response to signals from a microinstruction of said execution sequence read from said control store to apply said next address from said second register to said second store for causing said second store to return to said standard sequence referenced during the initial processing of said program instruction.

18. The system of claim 17 wherein said pathfinder store is a writable store enabling changes to be made to said address words for altering selection of sequences required for execution of a given set of said program instructions.

19. The system of claim 17 wherein said pathfinder store and control store are read only memories.

20. The system of claim 17 wherein said program instruction further includes at least an operand address portion;
   said standard sequences of microinstructions being coded to generate signals for conditioning said system to perform operations relating to fetching said operand and updating instruction addresses for fetching a next program instruction; and,
   each said microinstruction execution sequence being coded to generate signals for conditioning said system to perform operations specific to carrying out the operation specified by the operation code of said program instruction.

* * * * *